United States Patent
Hottinen

(10) Patent No.: US 7,489,736 B2
(45) Date of Patent: Feb. 10, 2009

(54) BLOCK MODULATION

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 775 days.

(21) Appl. No.: 10/993,486

(22) Filed: Nov. 22, 2004

(65) Prior Publication Data

US 2006/0078063 A1    Apr. 13, 2006

(30) Foreign Application Priority Data

Oct. 8, 2004    (FI)    ................. 20041311

(51) Int. Cl.
    H04B 7/02    (2006.01)
(52) U.S. Cl. .............. 375/267; 375/260; 375/295; 375/347; 375/299; 365/73; 365/230; 455/101
(58) Field of Classification Search ............ 375/267, 375/260, 295, 347, 299; 455/101; 365/230, 365/73
    See application file for complete search history.

(56) References Cited

U.S. PATENT DOCUMENTS

| | | | | |
|---|---|---|---|---|
| 5,940,445 | A * | 8/1999 | Kamin, Jr. ............ | 375/267 |
| 7,227,905 | B2 * | 6/2007 | Viswanathan ........... | 375/267 |
| 2002/0126740 | A1 | 9/2002 | Giannakis et al. | |
| 2005/0147180 | A1 * | 7/2005 | Ionescu .............. | 375/295 |
| 2005/0157807 | A1 * | 7/2005 | Shim et al. ........... | 375/267 |
| 2006/0045201 | A1 * | 3/2006 | Chae et al. ........... | 375/267 |
| 2006/0140294 | A1 * | 6/2006 | Hottinen et al. ....... | 375/260 |

OTHER PUBLICATIONS

Zhou et al, "Chip-Interleaved Block-Spread Code Division Multiple Access", IEEE Transactions on Communications, vol. 50, No. 2, Feb. 2002, pp. 235-248.
Hottinen et al, "Precoder Designs for High Rate Space-Time Block Codes", 2004 Conference on Information Sciences and Systems, Pinceton University, Mar. 17-19, 2004.
Hottinen, et al., "Multiuser Scheduling with Matrix Modulation", IEEE International Symposium on Signal Processing and Information/Technology, Dec. 2003, pp. 5-8.
Terry, J., "Layered Matrix Modulation", IEEE Radio and Wireless Conference, Sep. 19-22, 2004, ISBN: 0-7803-8451-2, XP-10764560, pp. 107-110.

* cited by examiner

Primary Examiner—Chieh M. Fan
Assistant Examiner—Eva Puente
(74) Attorney, Agent, or Firm—Squire, Sanders & Dempsey, L.L.P.

(57) ABSTRACT

A device and method for block transmission include a storage configured to store at least one transmission matrix relating to a set of symbols, and a processor configured to process at least part of the at least one transmission matrix to symbols forming at least a subset of the set of symbols for forming processed symbols. The device and method further include a generator configured to generate at least one transmission signal based on the processed symbols. The at least one transmission matrix is a direct product of a first matrix and a second matrix. The second matrix is different from an identity matrix. A size of each of the second matrix and the first matrix being at least two times two. At least one entry of the first matrix having a complex value.

61 Claims, 5 Drawing Sheets

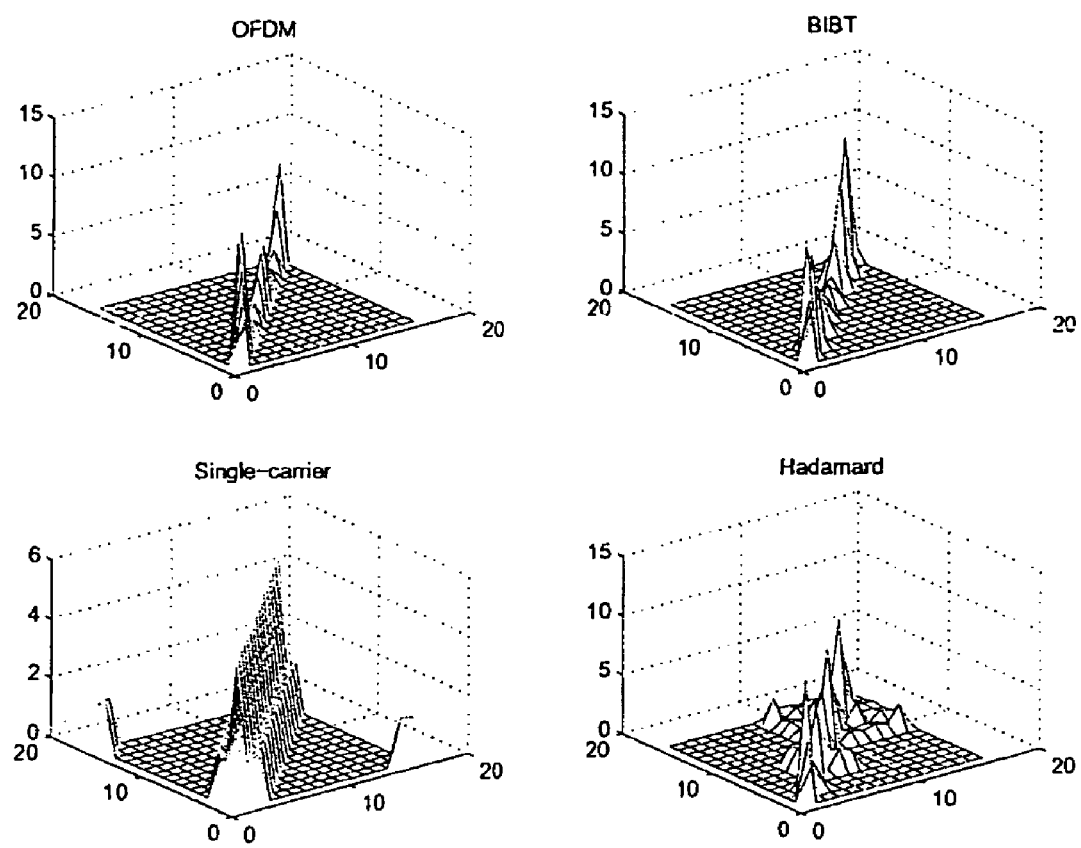
Figure 1: Symbol correlation structure for different block transmission methods.

BLOCK MODULATION

FIELD OF THE INVENTION

The present invention relates to transmitting information in a wireless communication system. In particular, the present invention relates to block transmission.

BACKGROUND OF THE INVENTION

A communication system can be seen as a facility that enables communication between two or more entities such as user equipment and/or other nodes associated with the system. The communication may comprise, for example, communication of voice, data, multimedia and so on. The communication system may be circuit switched or packet switched. Furthermore, there may be point-to-point, point-to-multipoint or multipoint-to-point connections. The communication system may be configured to provide wireless communication.

Block transmission refers to transmitting information bearing data in given blocks, where a block contains a fixed or a variable number of symbols or bits. Typically a whole block of symbols needs to be received before it is possible to detect reliably the symbols that were transmitted. In symbol-by-symbol transmission it is possible to detect a transmitted symbol based on a received symbol. Block transmission is used to mitigate effects due to inter-symbol interference (ISI) or, in case of code division, inter-chip interference (ICI) induced by a transmission channel. In transmitting digital data over frequency selective media, inter-symbol interference or inter-chip interference is a major performance limiting factor. Frequency selective media refers to certain frequencies exhibiting significant fading. Frequency selective fading becomes an issue especially for high transmission rates.

Block transmission using orthogonal frequency division multiplexing (OFDM) or code division multiplexing (CDM) waveforms has become popular in current communications systems and in proposals for future communications systems. ODFM is used, for example, in Digital Video Broadcasting—Terrestrial (DVB-T) systems and Wireless Fidelity (WiFi) systems, for example those that meet the IEEE 802.11 specifications. ODFM has also been considered for various future wireless systems. Multicode (CDM) transmission is used in 3G cellular systems, for example in Wideband CDMA (WCDMA) and cdma2000 systems. In addition, various combinations of the above have been proposed, for example multi-carrier CDMA systems which contain frequency-spreading (or preceding) before transmitting the symbols via a subcarrier or subcarriers.

Both of OFDM and CDM systems have their advantages and drawbacks. OFDM has a high peak-to-average power ratio (PAR). PAR results from simultaneous (parallel) transmission of several sub-carriers, and the peak power typically increases as the number of (simultaneously transmitted) summed carriers increases. High PAR typically requires an expensive or complex amplifier and therefore it is of interest to define signaling so that PAR is reduced as much as possible. Furthermore, there are tradeoffs in performance. Namely, due to lack of diversity, the performance of OFDM saturates whenever the outer coding rate is high (above ¾ say). On the other hand, an OFDM receiver is simple, as OFDM signals can be optimally detected with operations involving Discrete Fourier Transform (DFT) or Fast Fourier Transform (FFT). This optimal detection assumes the use of cyclic prefix, zero padding or other relevant guarding between transmission blocks. Furthermore, the transmission channels should be perfectly estimated. On the other hand, CDM or combined CDMA-OFDM distributes symbol energy over multiple frequency bins increasing frequency diversity. CDM therefore often has better performance than OFDM, provided that a proper and a more complex receiver is used.

A chip-interleaved, block-spread multiuser communications method and system has been discussed by S. Zhou, G. B. Giannakis, and C. Le Martret, in "Chip-Interleaved Block-Spread Code Division Multiple Access", IEEE Transactions on Communications, Vol. 50, No. 2, February 2002. There exists also a relating U.S. patent application 2002/0126740. The chip-interleaved block-spread code division multiple access (CIBS-CDMA) transmission may be implemented by processing symbols to be transmitted in accordance with code division, that is by spreading each symbol with a spreading code consisting of chips. The resulting chips may then be written into a buffer row by row, each row containing chips of a symbol. After chips relating to a set of symbols (block) have been written to the buffer, zero padding (a row of guard chips) is added for avoiding interference between sequential chips relating to a given symbol. The chips are then read out from the buffer column by column.

An aim of the present invention is to provide a versatile method for block transmission.

SUMMARY OF THE INVENTION

In accordance with a first aspect of the invention, there is provided a method for transmitting information, the method comprising applying at least part of at least one transmission matrix relating to a set of symbols to at least one subset of said set of symbols for forming processed symbols, and generating at least one transmission signal based on said processed symbols, wherein said at least one transmission matrix is a direct product of a first matrix, an identity matrix having the size of at least two times two, and a second matrix, said second matrix being different from an identity matrix, and the size of each of the second matrix and the first matrix being at least two times two.

In accordance with a second aspect of the invention there is provided a method for transmitting information, the method comprising applying at least part of at least one transmission matrix relating to a set of symbols to at least one subset of said set of symbols for forming processed symbols, and generating at least one transmission signal based on said processed symbols, wherein said at least one transmission matrix is a direct product of a first matrix and a second matrix, said second matrix being different from an identity matrix, the size of each of the second matrix and the first matrix being at least two times two, and at least one entry of the first matrix having a complex value.

In accordance with a third aspect of the invention there is provided a device for block transmission, said device comprising means for storing at least one transmission matrix relating to a set of symbols, means for applying at least part of said at least one transmission matrix to symbols forming at least a subset of said set of symbols for forming processed symbols, and means for generating at least one transmission signal based on said processed symbols, wherein said at least one transmission matrix is a direct product of a first matrix, an identity matrix having the size of at least two times two, and a second matrix, said second matrix being different from an identity matrix, and the size of each of the second matrix and the first matrix being at least two times two.

In accordance with a fourth aspect of the invention there is provided a device for block transmission, the device comprising means for storing at least one transmission matrix relating to a set of symbols, means for applying at least part of said at least one transmission matrix to symbols forming at least a subset of said set of symbols for forming processed symbols, and means for generating at least one transmission signal based on said processed symbols, wherein said at least one transmission matrix is a direct product of a first matrix and a second matrix, said second matrix being different from an identity matrix, the size of each of the second matrix and the first matrix being at least two times two, and at least one entry of the first matrix having a complex value.

In accordance with a fifth aspect of the invention there is provided a communications system comprising at least one device in accordance with the third or the fourth aspect of the invention.

In accordance with a sixth aspect of the invention there is provided a device for block modulation, the device being configured to apply to received signals at least part of a receiver matrix which corresponds to at least one transmission matrix, said at least one transmission matrix being a direct product of a first matrix, an identity matrix having the size of at least two times two, and a second matrix, said second matrix being different from an identity matrix, and the size of each of the second matrix and the first matrix being at least two times two.

In accordance with a seventh aspect of the invention there is provided a device for block modulation, the device being configured to apply to received signals at least part of a receiver matrix which corresponds to at least one transmission matrix, said at least one transmission matrix being a direct product of a first matrix and a second matrix, said second matrix being different from an identity matrix, the size of each of the second matrix and the first matrix being at least two times two, and at least one entry of the first matrix having a complex value.

In accordance with a eighth aspect of the invention there is provided a communication system comprising at least one device in accordance with the fifth or sixth aspect of the invention.

In accordance with a ninth aspect of the invention there is provided a. communication system comprising at least a first device in accordance with the third aspect of the invention and a second device in accordance with the sixth aspect of the invention.

In accordance with a tenth aspect of the invention there is provided a communication system comprising at least a first device in accordance with the fourth aspect of the invention and a second device in accordance with the seventh aspect of the invention In accordance with a eleventh aspect of the invention there is provided a method for receiving information, the method comprising receiving signals, and applying to received signals at least part of a receiver matrix which corresponds to at least one transmission matrix, said at least one transmission matrix being a direct product of a first matrix, an identity matrix having the size of at least two times two, and a second matrix, said second matrix being different from an identity matrix, and the size of each of the second matrix and the first matrix being at least two times two.

In accordance with a twelfth aspect of the invention there is provided a method for receiving information, the method comprising receiving signals, and applying on received signals at least part of a receiver matrix which corresponds to at least one transmission matrix, said at least one transmission matrix being a direct product of a first matrix and a second matrix, said second matrix being different from an identity matrix, the size of each of the second matrix and the first matrix being at least two times two, and at least one entry of the first matrix having a complex value.

In accordance with a thirteenth aspect of the invention there is provided a method for transmitting information, said method comprising associating parts of at least one transmission matrix relating to a set of symbols to a set of users, said at least one transmission matrix being a direct product of a first matrix, an identity matrix, and a second matrix, said second matrix being different from an identity matrix and being at least two time two in size, applying at least part of said at least one transmission matrix to at least one subset of said set of symbols for forming processed symbols, and generating at least one transmission signal based on said processed symbols, wherein receiver device complexity is taken into account in associating parts of said at least one transmission matrix to said set of users, each user being associated with a receiver device.

In accordance with a fourteenth aspect of the invention there is provide a device for transmitting information, said device comprising means for associating parts of at least one transmission matrix relating to a set of symbols to a set of users, said at least one transmission matrix being a direct product of a first matrix, an identity matrix, and a second matrix, said second matrix being different from an identity matrix and being at least two time two in size, means for applying at least part of said at least one transmission matrix to at least one subset of said set of symbols for forming processed symbols, and means for generating at least one transmission signal based on said processed symbols, wherein receiver device complexity is taken into account in associating parts of said at least one transmission matrix to said set of users, each user being associated with a receiver device.

In accordance with a fifteenth aspect of the invention there is provide a communication system comprising at least one device in accordance with the fourteenth aspect of the invention.

In accordance with further aspects of the invention, there are provided computer programs as defined in the appended claims.

BRIEF DESCRIPTION OF THE DRAWINGS

Embodiments of the present invention will now be described by way of example only with reference to the accompanying drawings, in which:

FIG. 1 shows correlation matrices relating to a know block transmission techniques and to one specific example in accordance with a first embodiment of the invention.

DETAILED DESCRIPTION OF EMBODIMENTS OF THE INVENTION

Figure 2A:
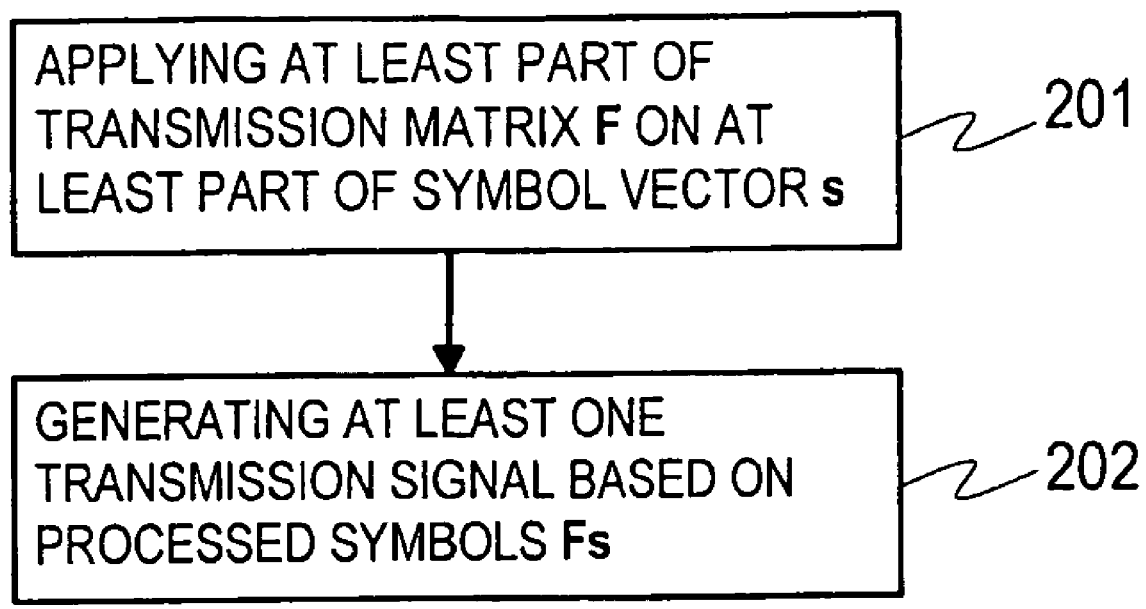
FIG. 2a shows a flowchart of a method in accordance with an embodiment of the present invention.

The term transmission matrix refers here to a matrix for processing a set of symbols carrying information to be transmitted. A set of symbols or a sequence of symbols is usually called a block. Typically a column or a set of distinct columns of a transmission matrix is used for processing symbols relating to a given user or to a given receiving device. Subsets of the set of symbol may be allocated to a number of users or to a number of information streams. The number of symbols in a subset affects the data rate relating to a user or information stream. All symbols belonging to the set of symbols may belong to the same user.

The set of symbols may be considered as a vector and the symbol vector is multiplied in the transmitter with the transmission matrix of appropriate dimension. This multiplication may be implemented in various ways, for example, via Inverse Fourier Transform (IFFT) or Discrete Fourier transform (DFT).

By denoting a transmission matrix F with and a set of symbols to be transmitted with vector $s=(s_1, \ldots, s_N)^T$, the outcome of applying the transmission matrix on the symbol vector is vector Fs. Each element of vector Fs is thus a linear combination of symbols forming the symbol vector s, the coefficients of the linear combination being defined by the elements of the transmission matrix F. The columns of F designate subcarriers (in conventional OFDM terminology), and each element or coordinate of Fs is mapped to typically pulse shaping module and converted to designated carrier frequency. Alternatively, the output Fs may be forwarded to another transmission unit, which may perform, for example, coding, multiple-access, modulation, power control, rate control, or preceding.

If the transmission matrix is related to transmitting the set of symbols from one transmitting device, the transmitting device knows the whole transmission matrix F and the whole symbol vector s. The transmitting device applies the transmission matrix on the symbol vector as described above. If there are a number of transmitters or transmitting devices, each of these units knows at least those columns of the transmission matrix that relate to the subset of symbols the unit is transmitting. The columns are then applied to the subset of symbols to produce partial linear combinations in accordance with the transmission matrix. These partial linear combinations are then transmitted from the plurality of transmitters or transmitting device(s) in accordance with the transmission matrix.

It is appreciated that this definition for a transmission matrix F is in line with the definitions of a user code matrix $C_m$ and a user-specific symbol block $s_m$ in the above mentioned article by Zhou, Giannakis and Martret. In more particular, the transmission matrix F for the system in this notation contains the columns of user code matrices $C_m$, m=0, ..., M-1 and the symbol vector s contains the user specific symbol blocks $s_m$. The length of a user specific symbol vector $s_m$ is K, and the length of the symbol vector s in this notation is MK. The symbol vector s contains all symbols relating to all users, receivers or information streams which are transmitted using the transmission matrix F in a given time window.

The idea behind the embodiments of the present invention can be expressed with matrix algebra in the following way. The proposed transmission matrix F may be defined as a $d_1$ dimensional square matrix by $$F=(F_a \otimes I) \otimes F_b \qquad (1),$$

where $F_a$ is a $d_2$ dimensional square multiplier matrix, $F_b$ is a $d_3$ dimensional square constituent matrix and I is a $d_1/(d_2 d_3)$ dimensional identity matrix. The notation $\otimes$ means a Kronecker product, also known as a direct product or a tensor product. The dimension of the constituent matrix $F_b$ is larger than 1, $d_3 > 1$. The constituent matrix $F_b$ is in general unitary, or a (complex) scalar multiple of a unitary matrix, or a matrix comprising a subset of the columns of a unitary matrix. The dimension of the multiplier matrix is larger than 1, $d_2 > 1$. The multiplier matrix $F_a$ is in general unitary, or a (complex) scalar multiple of a unitary matrix, or column restriction thereof as above.

In the appended claims, the term first matrix refers to matrix $F_a$ and the term second matrix refers to matrix $F_b$.

In a first embodiment of the invention, the identity matrix I in Equation 1 is reduced into scalar 1. The proposed transmission matrix F in accordance with the first embodiment may be defined as a $d_1$ dimensional square matrix by $$F=F_a \otimes F_b$$

where $F_a$ is a $d_2$ dimensional square multiplier matrix and $F_b$ is a $d_3$ dimensional square constituent matrix. The dimension of the constituent matrix $F_b$ is larger than 1, $d_3 > 1$. The dimension of the multiplier matrix is larger than 1, $d_2 > 1$. Furthermore, at least one of the entries of the multiplier matrix $F_a$ is complex.

In a second embodiment of the invention, the dimension of the identity matrix I is larger than 1. The dimension of the transmission matrix F is thus at least 8×8. The dimension of the constituent matrix $F_b$ is larger than 1, $d_3 > 1$. The dimension of the multiplier matrix is larger than 1, $d_2 > 1$. The multiplier matrix $F_a$ may be real, or at least one of the entries of the multiplier matrix $F_a$ may be complex.

It is appreciated that although this description in many places refers, by way of example, to matrices F, $F_a$ and $F_b$ as square matrices, they need not be square matrices.

To enlighten the naming convention of matrices $F_a$ and $F_b$, a couple of schematic examples are considered next. Below is shown the structure of a transmission matrix F consisting of a number of constituent matrix $F_b$. The entries of the constituent matrix are denoted with $F_b(i,j)$, where $1 < i,j < d_3$. Each constituent matrix $F_b$ is multiplied by a scalar $F_a(i,j)$. The scalars form the multiplier matrix $F_a$. In other words, entries of the multiplier matrix are $F_a(i,j)$, where $1 < i,j < d_2$. The specific transmission matrix F below relates to a situation, where the identity matrix I is reduced into a scalar in Equation (1).

$$\begin{pmatrix} F_a(1,1) \begin{pmatrix} F_b(1,1) & \cdots & F_b(1,d_3) \\ \vdots & \ddots & \vdots \\ F_b(d_3,1) & \cdots & F_b(d_3,d_3) \end{pmatrix} & F_a(1,2)F_b & \cdots & F_a(1,d_2)F_b \\ F_a(2,1)F_b & F_a(2,2)F_b & & F_a(2,d_2)F_b \\ \vdots & \vdots & \ddots & \vdots \\ F_a(d_2,1)F_b & F_a(d_2,2)F_b & \cdots & F_a(d_2,d_2)F_b \end{pmatrix}$$

A further schematic example of a transmission matrix F, where the dimension of the identity matrix I is three in Equation 1, is shown below. The identity matrix I in Equation 1 causes some of the even-sized blocks of the transmission matrix F below to be filled with zeros. It is appreciated that the zeros in the following formula represent matrix blocks having the size of matrix $F_b$ and being filled with zeros.

$$\begin{pmatrix} F_a(1,1)F_b & 0 & 0 & \cdots & F_a(1,d_2)F_b & 0 & 0 \\ 0 & F_a(1,1)F_b & 0 & \cdots & 0 & F_a(1,d_2)F_b & 0 \\ 0 & 0 & F_a(1,1)F_b & \cdots & 0 & 0 & F_a(1,d_2)F_b \\ \vdots & \vdots & \vdots & \ddots & \vdots & \vdots & \vdots \\ F_a(d_2,1)F_b & 0 & 0 & \cdots & F_a(d_2,d_2)F_b & 0 & 0 \\ 0 & F_a(d_2,1)F_b & 0 & \cdots & 0 & F_a(d_2,d_2)F_b & 0 \\ 0 & 0 & F_a(d_2,1)F_b & \cdots & 0 & 0 & F_a(d_2,d_2)F_b \end{pmatrix}$$

By defining a transmission matrix in accordance with the first embodiment or the second embodiment, where at least one of the matrixes $F_a$ and $F_b$ (preferably $F_a$) is an IFFT/IDFT matrix, a block transmission method inherits properties of both CDM and OFDM systems. This should lead to better performance with practical receivers than in either a CDM or OFDM system. This is because in practical receivers assumptions relating, for example, to perfect channel estimations typically do not hold. The concept also inherits properties of precoded OFDM systems.

As mentioned above, the constituent matrix $F_b$ may be a unitary matrix, different from the identity matrix. A unitary matrix U is a matrix whose inverse matrix is equal to its conjugate transpose matrix (that is, $U^{-1}=U^*$) The constituent matrix may be a Hadamard matrix. Entries of a n×n Hadamard matrix H are either +1 or −1, and $HH^T=nI$. The constituent matrix $F_b$ may, in more general terms, be a scalar multiple of a unitary or Hadamard matrix. Furthermore, it may comprise Orthogonal Variable Spreading factor (OVSF) codes as defined in UMTS, as those are related to Hadamard codes. This relates to the fact that multiplication with a scalar means increasing/decreasing transmission power. It does not affect the relative weights of the linear combinations.

The constituent matrix $F_b$ being unitary allows optimisation of the transmission matrix for specific cases. For example, different transmitters may utilize a different unitary $F_b$ matrix, as long as at least one them is different from identity matrix.

The matrices defined above in connection with the first embodiment and the second embodiment are orthogonal in a one-path channel. In a multipath channel the receiver experiences delayed columns of F, and then in general the columns (shifted for different delays) correlate, in the receiver. However, the transmitter knows the columns that correlate, when it knows the channel delay spread. The columns that correlate are affected by, zero-padding, cyclic prefix, or other means for mitigating interference between two consecutive symbols, and these may be appended to any of the constituent matrices $F_a$, $F_b$ or to F. The knowledge of subsets of orthogonal non-orthogonal columns of F (and thus s) may be used when defining an interleaving/permutation operation for symbols s. Each user or receiving device needs to know at least those columns of the transmission matrix that are used for processing information to be sent to the respective user or receiving device.

For being in part backward compatible with existing WCDMA system specifications, the constituent matrix $F_b$ may be a 4×4 matrix having (possibly scrambled) CDMA or OVSF spreading codes in the columns. Backward compatibility with respect to a given standard may be obtained by $F_b$ being a unitary matrix or an orthogonal matrix, or comprising columns of unitary/orthogonal matrix, such that these columns are valid waveforms for the given standard. WCDMA and CDMA systems use Orthogonal Variable Spreading factor (OVSF) codes, or Walsh codes, possible scrambled by a source specific scrambling code, and these waveforms may thus be used within the proposed transmission method. In the WCDMA case we may have a 4×1 vector in $F_b$ for one particular service or user. When another service/user is added, another column to $F_b$ is also added. In WCDMA there is additionally a diagonal pseudo random matrix, where the base station-specific scrambing code is in the diagonal. This diagonal pseudo random matrix multiplies from left some fixed $F_a$ and/or $F_b$ and/or F.

It is appreciated that, for example, zero padding or cyclic prefix may be added to the transmission matrix F, to either one of matrices $F_a$ and $F_b$ or to both matrices $F_a$ and $F_b$. F need thus not be a square matrix, although this description mainly refers to F as a square matrix of dimension $d_1$.

A column of the transmission matrix F is used for processing a given set of symbols to be transmitted, for example, to a specific user. As discussed above, it is possible to allocate a number of columns of the transmission matrix F to a specific user.

In the first embodiment of the invention, the dimension of the multiplier matrix $F_a$ is larger than one and the identity matrix I is reduced to scalar 1. As a concrete example, consider the following matrices $$F_a = \begin{pmatrix} \mu & v \\ -v^* & \mu^* \end{pmatrix} \text{ and } F_b = \begin{pmatrix} 1 & 1 \\ 1 & -1 \end{pmatrix}.$$

Here $F_a$ is a unitary matrix, and $(\mu,v)=(\sqrt{0.8}, \sqrt{0.2})$ indicating power 0.8 for $\mu$ and 0.2 for $v$. $F_b$ above is a 2×2 Hadamard matrix. The transmission matrix F in this case is $$F = \begin{pmatrix} \mu & \mu & \nu & \nu \\ \mu & -\mu & \nu & -\nu \\ -\nu^* & -\nu^* & \mu^* & \mu^* \\ -\nu^* & \nu^* & \mu^* & -\mu^* \end{pmatrix}.$$

In this case, where the identity matrix is reduced to scalar 1, the transmission matrix F above thus contains four times the constituent matrix $F_b$ multiplied with the complex entries of the multiplier matrix $F_a$. This transmission matrix F defines continues transmission, since there are no zeroes in the matrix.

As a second example of the first embodiment, consider a situation where the multiplier matrix $F_a$ is a 8-dimensional inverse Fast Fourier Transform (IFFT) matrix and the constituent matrix $F_b$ is a two dimensional Hadamard matrix. Furthermore, a cyclic prefix is added after a block of 16 symbols/chips. The resulting transmission matrix F is a matrix with 16 subcarriers, multicodes, or basis waveforms.

This second example, where $F_a$ is an IFFT matrix and $F_b$ is a Hadamard matrix, can be compared to conventional single-carrier transmission, CDMA and OFDM. For having 16 subcarriers in OFDM, the transmission matrix is a 16 times 16 IFFT matrix. For 16 multicodes in CDMA, the transmission matrix is a 16 times 16 Hadamard matrix, possibly scrambled. For a single carrier system, the transmission matrix is in this formalism an identity matrix of dimension 16.

To compare this second example to known techniques, received correlation matrices are determined. FIG. 1 shows correlation matrix entries for this second example (denoted BIBT in FIG. 1), for OFDM, for CDMA (denoted Hadamard in FIG. 1) and for a single carrier. For this second example of a transmission matrix in accordance with the first embodiment, the correlation matrix decomposes into 8 2×2 correlation matrices. This means that the transmission matrix can be used, for example, for transmitting information relating to 8 users or receivers without having signals relating to different users interfering with each other within a transmission block. This is done by assigning to each user one or more sets of correlating transmission matrix columns. In this specific example, each set of correlating matrix columns, considering matrices and appropriately delayed matrices according to delay spread L, with cyclic prefix of length L, contains two columns. It is possible to use a receiver capable of processing two interfering signals, and the rest of the sent signals need not be taken into account in receiving a signal relating to a specific user.

FIG. 1 shows that for CDMA (without scrambling) the largest block in the correlation matrix is 8×8. This means that a receiver needs to be able to process eight interfering signals. For OFDM, the correlation matrix is diagonal (correlation block size is one), and there is no interference between symbols within a block. The single-carrier case has interference within blocks of five symbols.

Alternatively to being an IFFT matrix, the multiplier matrix $F_a$ may be, for example, a Hadamard matrix, a random matrix or a pseudorandom matrix. Similarly, matrix $F_b$ may be, for example, a Hadamard matrix, a random matrix or a pseudorandom unitary matrix, or IFFT matrix, as these are all examples of unitary matrices. If $F_a$ or $F_b$ is a random or a pseudorandom matrix, the correlation properties are random, and may change, for example, between different blocks s (that is, between different sets of symbols). This is advantageous when the symbols are coded, for example with some outer code (such as with Turbo coding, convolutional coding, or using low density parity check codes, block codes) Furthermore, it is advantageous to have multiple transmitting devices, for example base stations, with unique $F_a$, $F_b$, or a unique pseudorandom set of $F_a$ and $F_b$. This way the interference between different transmitting units is randomised and the base stations or access points may be identified with unique pseudorandom matrices.

It is appreciated that in addition to examples mentioned above, other possibilities for $F_a$ or $F_b$ in the first embodiment include the use of wavelet basis vectors.

In the second embodiment of the invention, both the dimension of the identity matrix I and the dimension of the multiplier matrix $F_a$ are larger than 1. As a specific example, consider a case, where the dimension of I is two, $F_a$ is a unitary matrix and $F_b$ is a Hadamard matrix.

$$F_a = \begin{pmatrix} \mu & \nu \\ -\nu^* & \mu^* \end{pmatrix} \text{ and } F_b = \begin{pmatrix} 1 & 1 \\ 1 & -1 \end{pmatrix}.$$

In this case, the transmission matrix F becomes $$F = \begin{pmatrix} \mu & \mu & 0 & 0 & \nu & \nu & 0 & 0 \\ \mu & -\mu & 0 & 0 & \nu & -\nu & 0 & 0 \\ 0 & 0 & \mu & \mu & 0 & 0 & \nu & \nu \\ 0 & 0 & \mu & -\mu & 0 & 0 & \nu & -\nu \\ -\nu^* & -\nu^* & 0 & 0 & \mu^* & \mu^* & 0 & 0 \\ -\nu^* & \nu^* & 0 & 0 & \mu^* & -\mu^* & 0 & 0 \\ 0 & 0 & -\nu^* & -\nu^* & 0 & 0 & \mu^* & \mu^* \\ 0 & 0 & -\nu^* & \nu^* & 0 & 0 & \mu^* & -\mu^* \end{pmatrix}.$$

One of the advantages of this transmission matrix is that the peak-to-average ratio is smaller that in the case where the matrix comprises only non-zero elements, since a smaller number of symbols are summed together in constructing Fs.

Furthermore, an advantage of the first and the second embodiment is that delayed copies of the columns retain orthogonality to at least some other columns, when information streams processed with respective columns of the transmission matrix are transmitted over a FIR multipath channel, wherein the multipath channel is modelled as a finite impulse response filter, with maximum delay spread L (as opposed to IIR channel with infinite delay spread). Often L can be approximated as the number of dominant delay components.

It is appreciated that in this second embodiment, where dim(I)>1, the non-zero multipliers of the constituent matrix $F_b$ are entries of the multiplier matrix $F_a$. The dimensionality of the identity matrix in Equation 1 being larger than one causes some of the even-sized constituent matrixes are filled with zeros.

As mentioned above, the multiplier matrix $F_a$ is a (complex) scalar multiple of a unitary matrix. In this second embodiment, the multiplier matrix $F_a$ may be, for example, an IFFT matrix, a Hadamard matrix, a random matrix or a pseudorandom matrix. The constituent matrix $F_b$ may also be, for example, an IFFT matrix, a Hadamard matrix, a random matrix or a pseudorandom matrix. Similar discussion about the random correlation properties as above for the first embodiment applies here.

As a second specific example of the second embodiment, $F_a$ may be a Hadamard matrix and $F_b$ may be unitary. In this case, the transmission scheme is partly backward compatible with OFDM, if $F_b$ is an IFFT matrix.

FIG. 2a shows a flowchart of a method 200 in accordance with an embodiment of the present invention. In step 201 at least part of a transmission matrix is applied to at least one subset of the symbol vector s for forming processed symbols. If the whole transmission matrix F is applied on the whole symbols vector s the processed symbols are the vector Fs. Otherwise, only some columns of the transmission matrix F are applied on the relating elements of the symbol vector s. In this case, the processed symbols are some elements of the vector Fs. In step 202, at least one transmission signal is generated based on said processed symbols. The transmission matrix F may be in accordance with the first or the second embodiment of the invention.

Figure 2B:
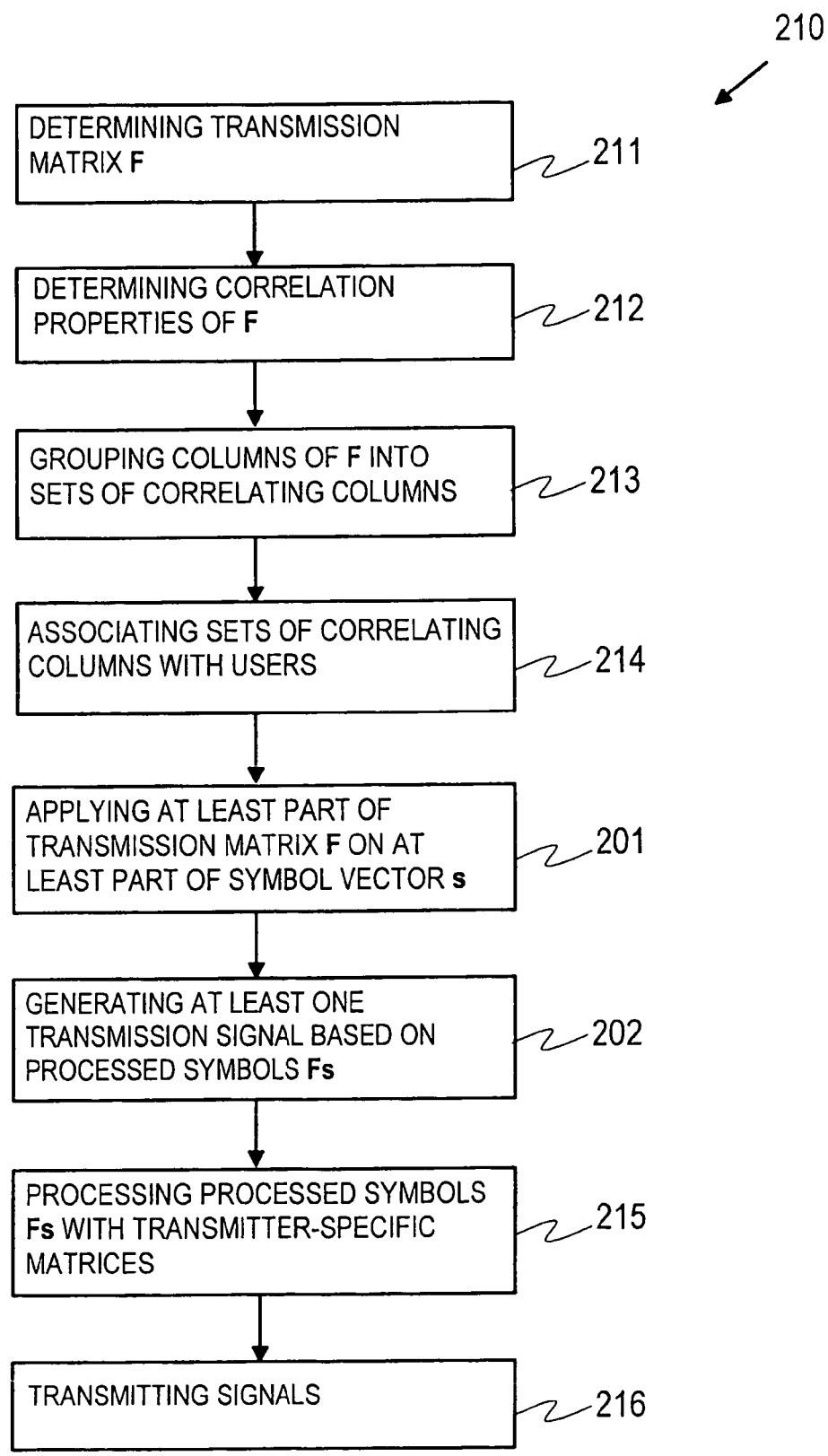
FIG. 2b shows a flowchart of a further method in accordance with a further embodiment of the present invention.

FIG. 2b shows a flowchart of a method 210 in accordance with a further embodiment of the present invention. The transmission matrix used in the method 210 may be in accordance with the first or the second embodiment of the invention.

In step 211, a transmission matrix F is determined. This step may involve, for example, selecting a transmitter specific constituent matrix from a set of available constituent matrices. In step 212, correlation properties of the transmission matrix F are determined. The correlation properties can be determined using any known technique. Such techniques are known to one skilled in the art, and are therefore not discussed here in more detail. In step 213, columns of the transmission matrix F are grouped into sets of correlating columns. In step 214, the sets of correlating columns are associated with a plurality of users/receivers/information streams. One option is to associate each set of correlating matrix columns to one user. In this case the signals sent to other users do not interfere significantly with the signals sent to a specific user. A second option is to associate a set of correlating matrix columns to a set of users. In this case, the signals sent to this set of users typically interfere. The users belonging to this set should know all matrix columns used for sending information this set of users for being able to detect the symbols intended for them. A further option is to associate two or more sets of correlating matrix columns to a user, if the data rate required cannot be provided with only one set of correlating matrix columns. The number of transmission matrix columns (or, in other words, the number of symbols in the symbol vector s) is proportional to the data rate.

It is clear that the above mentioned options for associating matrix columns to users are to be understood as examples, not an exhaustive list. Furthermore, as an alternative to steps 213 and 214, it is possible to associate the correlating columns to users based on the correlation properties; the grouping of transmission matrix columns may be an implicit step. Also in this case there are various options for associating the transmission matrix columns to users/receivers/information streams.

As the receiver device complexity depends on how the sent signals are expected to be correlated with each other, it is possible to take into account receiver device complexity in transmitting signals. If a certain receiver device is known to have a low complexity, it may be associated with a set of transmission matrix columns that do no correlate with other transmission matrix columns that are currently in use. If another receiver device is known to be able to process interfering signals, this receiver device may be associated with matrix columns that correlate with matrix columns in use with other receiver devices.

The method 210 continues with steps 201 and 202. If the elements of the vector Fs are to be transmitted, for example, from a plurality of transmitter devices, it is possible to further process these processed symbols using transmitter-specific matrices in step 215 for separating transmissions from different transmitters. Thereafter the transmission signals are transmitted in step 216.

As mentioned above, the correlation properties of the transmission matrix may be used in determining which columns of the transmission matrix F to use for which users/receiver/information streams. The correlation properties are typically determined off-line or on-line. Offline typically means using channel models. On-line means using estimated information on channel, for example, on delay spread L. The same L is used in designing the length of cyclic prefix prior art block transmission methods.

Figure 3A:
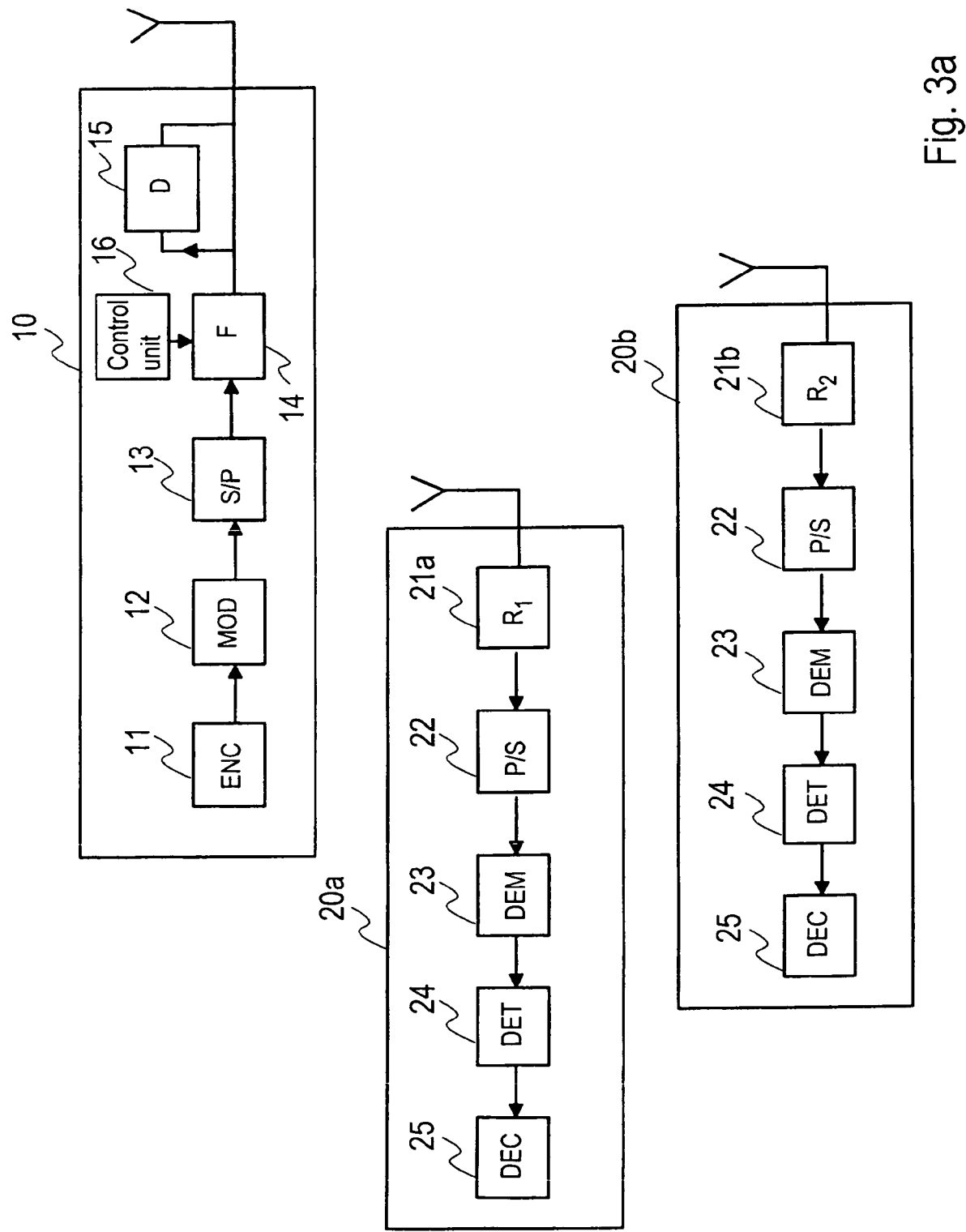
FIG. 3a shows, as an example, a block diagram of a transmitting device and receiving devices in accordance with an embodiment of the invention.

FIG. 3a shows, as an example, a block diagram of a transmitting device 10 where a transmission matrix F is applied. This device 10 transmits all elements of a symbol vector s, and it thus applies the whole transmission matrix F to the symbol vector s. The transmitting device 10 typically contains an encoder ENC 11, and information streams (bits) coming from the encoder 11 are input to a modulator MOD 12. The modulator may be, for example, a scalar, vector or matrix modulator. The output from this modulator is a sequence of consequent symbols. The symbols are input to a serial-to-parallel converter S/P 13, where a symbol vector (an ordered set of symbols) is formed. The symbol vector is then input to a block modulation unit 14, where the transmission matrix F is applied to the symbol vector. In addition to the functionality shown in FIG. 3a, there may be some further functionality before the transmission signals are input to an antenna. As an example, pulse shaping functionality maybe placed before the antenna. Thereafter the transmission signals are input to an antenna for transmission. There may be a delay unit 15 before the antenna, or a cyclic delay operation. This delay unit enables, for example, delay diversity transmission. Furthermore, there may be a matrix-construction unit that constructs a diversity or MIMO modulation matrix (using, for example, high-rate space-time coding).

The transmitting device 10 also contains the control unit 16 for associating the symbols/transmission matrix columns to users. This control unit 16 controls that the symbol vector and the block modulation unit 14 have symbols and transmission matrix columns in a corresponding order. The symbols and transmission matrix columns may be ordered based on correlation assessment. The control unit 16 furthermore controls that there is a correct number of symbols per each user in the symbol vector. The correlation properties of the transmission matrix may be taken into account in the control unit 16. The control unit 16 may also be responsible for determining the transmission matrix. For example, the transmission matrix may have a transmitter-specific constituent matrix $F_b$. As a second example, the transmission matrix may be time dependent by having either a time-dependent multiplier matrix $F_a$ or a time-dependent constituent matrix $F_b$, or both.

The transmitting device 10 may be, for example, a base station in a cellular communications network. In general, it may be any transmitting device configured to transmit signals to one or more receiving devices, including WLAN device or access point or Ultrawideband transmitter.

FIG. 3a shows, as examples, also block diagrams of two receiver devices 20a and 20b. The receiver device 20a contains a receiver matrix unit 21a, where a receiver matrix or columns or a receiver matrix are applied on received signals. It is appreciated that this unit may be implemented fully or in part with special algorithms or with corresponding implementations, such as using Fast Fourier Transform, or Fast Walsh Transform. The result is a vector of received signals, and it is input into a parallel-to-serial converter P/S 22. The sequence of symbols is then input to a demodulator 23 which converts the symbols to bits. The received symbols are detected in a symbol detector 24, which typically uses channel information in detection. It is appreciated that the receiver matrix unit (or block demodulation unit) may use also various interference reduction methods or advanced detection methods, such as receiver matrices derived from minimum mean square error principle (known in the art) or some interference cancellation units, or sequence detection unit (such as Maximum A Posteriori (MAP) or Maximum Likelihood Sequence Estimate (MLSE) detector, or simplification thereof), or any approximate Maximum Likelihood detection method such as Sphere detection. Furthermore, these units may output hard or soft decisions. Thereafter the received symbols, or the corresponding hard or soft bits are decoded in the decoder 25.

The receiver matrix unit R1 21*a* in the receiving device 20*a* contains information of at least those transmission matrix columns that are associated with this receiving device in the transmission. Alternatively, the receiver matrix unit R1 21*a* may contain information about all the transmission matrix columns. The receiver matrix unit R1 21*a* in the device 20*a* may thus contain information about different transmission matrix columns than the receiver matrix unit R2 21*b* in the device 20*b*. The receiving device 20*a* may obtain information about the transmission matrix columns associated with it, for example, by receiving signalling information about the transmission matrix column allocation. The details of how to determine a receiver matrix based on information about a transmission matrix are clear to a skilled person.

Figure 3B:
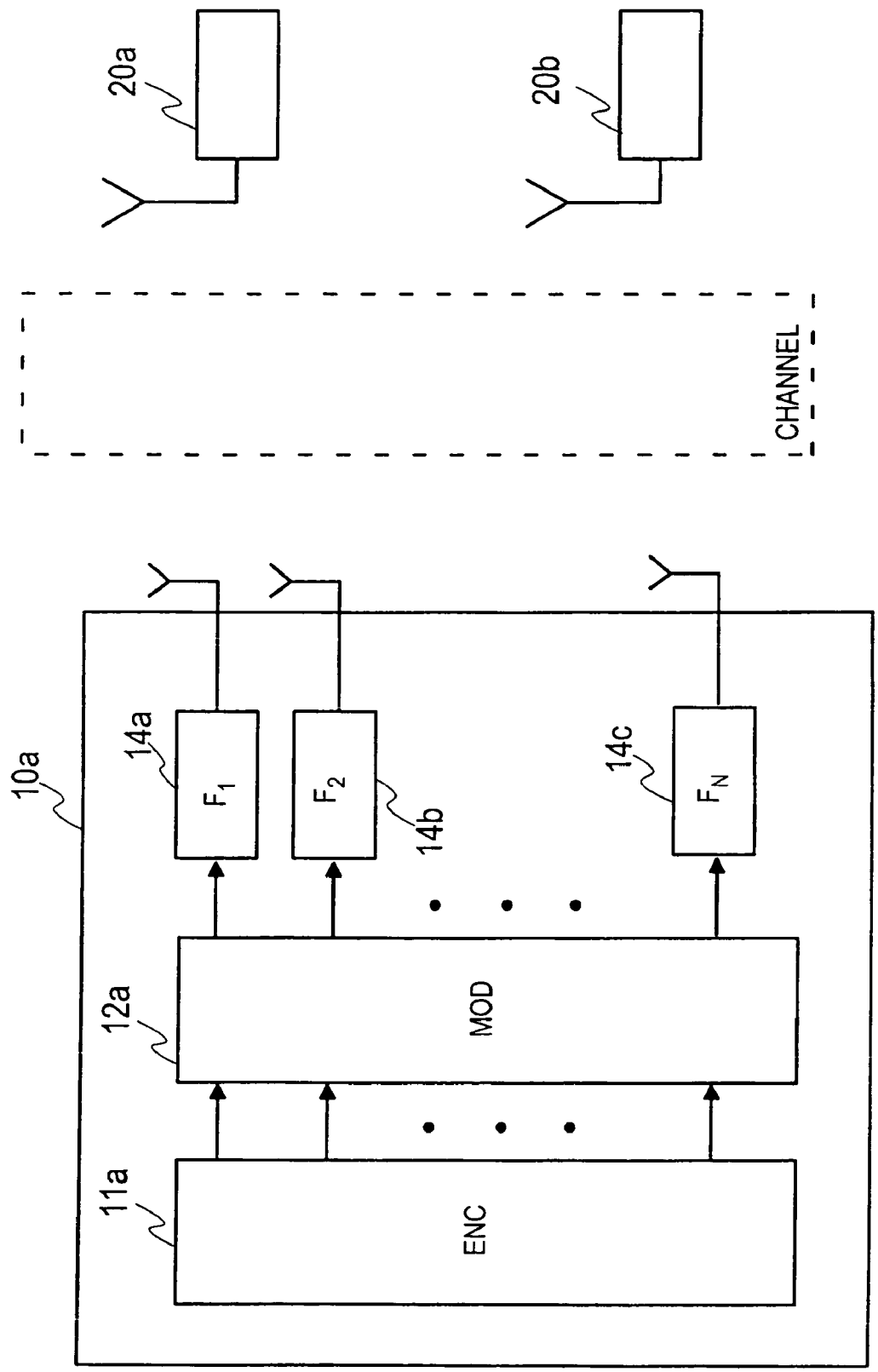
FIG. 3b shows, as a further example, a block diagram of a further transmitting device in accordance with an embodiment of the invention.

FIG. 3*b* shows, as a further example, a block diagram of a transmitting device 10*a*. In this transmitting device 10*a*, the encoder 11*a* and the modulator 12*a* process parallel information streams. The parallel information streams at given time form a symbol vector. The parallel information streams from the modulator 12*a* are fed into a plurality of block modulation units 14*a*, 14*b*, 14*c*. Each of these transmission matrix blocks represents one column $F_j$ of a transmission matrix F.

It is clear to one skilled in the art that further variations and modifications in the transmitting devices are possible. There may be, for example, a plurality of transmitting devices, each using a set of transmission matrix columns. These transmission devices may be, for example, mobile stations of a cellular communications system. In general, they may be any devices configured to transmit signals.

It is appreciated that most other units in a transmitting and/or receiving device than the block modulation unit 14 and the receiver matrix unit 21 may be implemented using known techniques. Furthermore, it is appreciated that the block diagrams in FIGS. 3*a* and 3*b* are illustrative. The functionality of some or all units may be provided using a single piece of equipment. Typically the functionality is provided as a suitable combination of hardware and software.

The receiver needs to know only its own transmission matrix columns, or the columns that are known to be interfering in the given channel with the transmission matrix columns associated with this receiver. As a comparative example, it is noted that in CDMA systems all transmission matrix columns need to be used for optimal reception. In an OFDM only one transmission matrix column. In accordance with embodiments of the present invention, the receiver needs to know only some transmission matrix columns, more specifically those transmission matrix columns that interfere most with the transmission matrix columns associated to this receiver. In some cases, blind receivers may be used where the receiver estimates receiver filters using measured quantities, such as interference correlation or covariance matrices. These receiver filters may be optimised in manner that is identical to those used, for example, in CDMA literature. Such filters may operate at symbol rate or at or above chip rate, where the chip rate is essentially the inverse of the time required to transmit a smallest unit (one element) of matrix F.

It is appreciated that a general transmission matrix F defined by $F=(F_a \otimes I) \otimes F_b$, where the constituent matrix $F_b$ is at least the size of 2 times 2, allows taking into account the receiver device complexity in associating parts of the transmission matrix to a set users relating to these receiver devices. As explained above, the receiver device complexity may be taken into account using the correlation properties of the transmission matrix.

It is appreciated that using a transmission matrix F as defined above in connection with Equation 1, the complexity of a receiver can be also adjusted by the selection of the matrices $F_a$ and $F_b$ and by the selection of the dimension of the identity matrix I. In a CDMA receiver, all transmitted symbols within a block may interfere with each other in a worst case. These symbols may relate to one user (in multicode transmission) or to many users. Comparing to a CDMA receiver, a receiver in accordance with embodiments of the present invention is less complex, since the receiver knows a priori which columns interfere with each other most.

It is appreciated that the sets of symbols to be sent may be sent from one transmitting device, for example from a base station. This means that the columns of the transmission matrix are all used in the base station. Alternatively, the sets of symbols may be sent from a set of antennas. It is possible that each set of processed symbols is sent from a separate antenna. The antennas may belong to one network element or transmitting device, or each antenna may belong to a respective transmitting device. It is, of course, also possible that some transmitting devices have only one antenna and some have more than one antenna. In this case, the number of the transmission matrix columns associated with each transmitting device typically equals the number of antennas in the respective transmitting device.

It is appreciated that the transmission matrix F in Equation 1 does not involve scrambling, which is typically used in communication systems for separating signals sent from different CDMA base station or other corresponding network elements It is possible to add scrambling after processing symbols using the transmission matrix F. Scrambling may be implemented, for example, as a transmitting-device-specific or antenna-specific diagonal matrix $\Lambda_j$ relating to scrambling. A transmitting device specific transmission matrix $G_j$ would in this case be $G_j=\Lambda_j F$. Alternatively, it is possible that the signals from different transmitting devices or antennas are processed using a set of more general matrices $A_j$. In this case, $G_j=A_j F$. Here A may be an arbitary, unitary matrix.

It is furthermore possible that the transmission matrix as defined in connection with Equation 1 above is transmitting device or antenna specific. In other words, $F_j=(F_a \otimes I) \otimes F_{b,j}$, where there is defined a plurality of matrices $F_{b,j}$.

It is appreciated that the transmission matrix F defined above in connection with Equation 1 may form a part of a combination matrix used for processing sets of symbols. The combination matrix may be a sum of the transmission matrix F and a further matrix. The further matrix typically relates to block based transmission. Some examples of block-based matrices that may be added up with a transmission matrix F are the following: matrix relating to orthogonal frequency division multiplexing, matrix relating to code division multiplexing, and matrix relating to chip-interleaved block-spread transmission.

Typically a combination matrix of a transmission matrix F and of a further matrix results in a combination matrix where many columns interfere in a transmission channel. Therefore, a reduced set of non-correlating columns may be selected from the combination matrix.

A further modification is that there is defined a sequence of transmission matrices F, and that for consecutive blocks of symbols different transmission matrices are used in accordance with the defined transmission matrix sequence. One example is that the multiplier matrix $F_a$ is time dependent. A further example is that the multiplier matrix $F_a$ is selected from a set of matrices forming a rotation, i.e. unitary of an orthogonal matrix.

It is appreciated that although a cellular communications system with base stations is mentioned above, the present invention is applicable in any communication system where block-based transmission is used. As further examples, the present invention may be applied in wireless local area networks (WLAN), DVB-T, Ultrawideband communications, to name a few examples. The communication systems, where the present invention may be applicable, are not restricted to SISO (single-input-single-output) systems. The invention may be applicable also in SIMO (single-output-multiple-input) systems, in MIMO (multiple-input-multiple-output), or in MISO (multiple-input-single-output) systems. Various diversity schemes may also be applicable together with the present invention. Different delay diversity concepts may be used, for example by sending delayed copies of transmitted signal from at least one antenna, by using the defined transmission matrix F as a basis matrix in multi-antenna block transmission methods, or in any method where block transmission is used in a multi-antenna channel. Some examples of multi-antenna block transmission methods are discussed by A. Hottinen and O. Tirkkonen, "Precoder designs for high rate space-time block codes," in Proc. Conference on Information Sciences and Systems 2004 (CISSI 2004), Princeton, N.J. USA, March 2004.

It is also appreciated that although the specification mainly refers to columns of the transmission matrix and to a N times 1 symbol vector, it is clear to a person skilled in the art that similar solutions may employ transpose matrices or other notations for linear algebra.

It is furthermore appreciated that the transmission matrix F that is a direct product of the multiplier matrix, the (optional) identity matrix, and the constituent matrix may be multiplied with unitary matrices before it is applied on the symbol vector. It is also appreciated that the transmission matrix F being a direct product of the given matrixes means does not mean that methods or apparatus involved in applying a transmission matrix in accordance with the invention need to be aware of the multiplier matrix $F_a$ and/or the constituent matrix $F_b$. It is sufficient that they are aware of the transmission matrix F and that there in general exist two matrixes $F_a$ and $F_b$ in accordance with the above description so that the transmission matrix F can be represented as $F=(F_a \otimes I) \otimes F_b$ or $F=F_a \otimes F_b$.

It is also appreciated that although the above description mainly concentrates on using a transmission matrix F, which dependent on a single constituent matrix $F_b$, the present invention is not restricted to this example. For example, each transmitter of a plurality of transmitters may be using a set of columns of a transmission matrix F, where the constituent matrix $F_b$ is transmitter-specific. In this case, the effective transmission matrix of the whole system is representable as a block matrix, where the constituent matrix $F_b$ is replaced by a set of constituent block matrixes. These matrices may alternatively or in addition be time-specific, so that the matrices are different for different modulation blocks transmitted at different times. Furthermore, the matrices may be antenna-specific, so that different matrices at used in a different transmitter antenna or beam.

It is yet appreciated that the transmission matrices can be formed also by defining an appropriate precoding matrix for another block transmission matrix. For example, if the system supports currently matrix H (say a Hadamard matrix), but the transmission is desired to use matrix F (as given in the preceding text), we may calculate a preceding matrix U as U=inv (H)F, where inv designates matrix inverse. In this way we can use the invention on a system where H is fixed (for example, due to its implementation in hardware) and determine the desired preceding matrix that leads, when combined with H) to a desired block transmission method F.

It is appreciated that a computer program as defined in the appended claims may be embodied on a record medium or stored in a memory of a computing device.

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method in a communication system, comprising
applying at least part of at least one transmission matrix relating to a set of symbols to at least one subset of said set of symbols for forming processed symbols; and
generating at least one transmission signal based on said processed symbols,
wherein said at least one transmission matrix is a Kronecker product of a first matrix, an identity matrix having a size of at least two times two, and a second matrix, said second matrix being different from said identity matrix, and the size of each of the second matrix and the first matrix being at least two times two.

2. A method as defined in claim 1, wherein said first matrix is one of the following: a Hadamard matrix, a unitary matrix, an inverse Fast Fourier Transform matrix, an inverse Discrete Fourier Transform matrix, a random matrix, and a pseudorandom matrix.

3. A method as defined in claim 1, wherein said second matrix is one of the following: a Hadamard matrix, a unitary matrix, an inverse Fast Fourier Transform matrix, an inverse Discrete Fourier Transform matrix, a random matrix, and a pseudorandom matrix.

4. A method as defined in claim 1, wherein said second matrix is a Hadamard matrix and said first matrix is a unitary matrix.

5. A method as defined in claim 1, wherein at least a part of a first transmission matrix is applied to at least a first subset of said set of symbols and at least a part of a second transmission matrix is applied to at least a second subset of said set of symbols, the first transmission matrix relating to a different second matrix than the second transmission matrix.

6. A method as defined in claim 1, wherein said applying of at least part of said at least one transmission matrix comprises applying at least a predefined matrix to said at least one subset of said set of symbols.

7. A method as defined in claim 6, further comprising:
determining a further matrix based on an inverse of the predefined matrix and the at least one transmission matrix.

8. A method as defined in claim 6, wherein said applying of said predefined matrix is implemented in hardware.

9. A method as defined in claim 7, wherein said applying of said further matrix is implemented in software.

10. A method as defined in claim 1, wherein in said applying, said at least one transmission matrix is applied to said set of symbols.

11. A method as defined in claim 10, further comprising:
transmitting said at least one transmission signal from one transmitting device.

12. A method as defined in claim 1, wherein in said applying, a first set of columns of said at least one transmission matrix is applied on a first subset of said set of symbols and a second set of columns of said at least one transmission matrix is applied on a second subset of said set of symbols.

13. A method as defined in claim 12, further comprising:
transmitting a first transmission signal relating to said first subset of said set of symbols from a first transmitting device and a second transmission signal relating to said second subset of said set of symbols from a second transmitting device.

14. A method as defined in claim 1, further comprising:
transmitting said at least one transmission signal.

15. A method as defined in claim 1, further comprising:
processing said at least one subset of said set of symbols using a unitary matrix before applying said at least one transmission matrix.

16. A method as defined in claim 1, further comprising:
processing said at least one subset of said set of symbols using a combination matrix, wherein said at least one transmission matrix forms a part.

17. A method as defined in claim 16, wherein said combination matrix is a sum of said at least one transmission matrix and a further matrix.

18. A method as defined in claim 17, wherein said further matrix relates to block based transmission.

19. A method as defined in claim 18, wherein said further matrix relates to one of the following: orthogonal frequency division multiplexing, code division multiplexing, and chip-interleaved block-spread transmission.

20. A method as defined in claim 16, further comprising:
selecting from said combination matrix non-correlating parts for processing said at least one subset of said set of symbols.

21. A method as defined in claim 1, further comprising:
determining correlation properties of at least one of said at least one transmission matrix.

22. A method as defined in claim 21, further comprising:
grouping said at least one transmission matrix into sets of correlating parts.

23. A method as defined in claim 22, further comprising:
associating said sets of correlating parts to users.

24. A method as defined in claim 21, further comprising:
associating parts of said at least one transmission matrix to users based on said correlation properties.

25. A method as defined in claim 21, further comprising:
taking into account user equipment complexity when associating parts of said at least one transmission matrix to users.

26. A method as defined in claim 1, further comprising:
processing said processed symbols with at least one transmitter-specific matrix for separating transmissions from transmitters.

27. A method as defined in claim 1, further comprising:
selecting said second matrix from a plurality of second matrices relating to a plurality of transmitters.

28. A method as defined in claim 1, wherein said applying comprises multiplying said at least one transmission matrix with at least one of the following: a scalar, a complex scalar, and a unitary matrix.

29. A method in a communication system, comprising:
applying at least part of at least one transmission matrix relating to a set of symbols to at least one subset of said set of symbols for forming processed symbols; and
generating at least one transmission signal based on said processed symbols,
wherein said at least one transmission matrix is a Kronecker product of a first matrix and a second matrix, said second matrix being different from an identity matrix, a size of each of the second matrix and the first matrix being at least two times two, and at least one entry of the first matrix having a complex value, wherein said second matrix is a Hadamard matrix and said first matrix is an inverse Fourier Transform matrix.

30. A method as defined in claim 29, wherein said first matrix is one of the following: a unitary matrix, and an inverse Discrete Fourier Transform matrix.

31. A method as defined in claim 29, wherein said second matrix is one of the following: a unitary matrix, a random matrix, and a pseudorandom matrix.

32. A method as defined in claim 29, wherein at least a part of a first transmission matrix is applied to at least a first subset of said set of symbols and at least a part of a second transmission matrix is applied to at least a second subset of said set of symbols, the first transmission matrix relating to a different second matrix than the second transmission matrix.

33. A method as defined in claim 29, wherein said applying of at least part of said at least one transmission matrix comprises applying at least a predefined matrix to said at least one subset of said set of symbols.

34. A method as defined in claim 29, wherein in said applying, said at least one transmission matrix is applied to said set of symbols.

35. A method as defined in claim 29, wherein in said applying, a first set of columns of said at least one transmission matrix is applied on a first subset of symbols and a second set of columns of said at least one transmission matrix is applied on a second subset of said set of symbols.

36. A method as defined in claim 29, further comprising:
transmitting said at least one transmission signal.

37. A method as defined in claim 29, further comprising:
processing said at least one subset of said set of symbols using a unitary matrix before applying said at least one transmission matrix.

38. A method as defined in claim 29, further comprising:
processing said at least one subset of said set of symbols using a combination matrix, wherein said at least one transmission matrix forms a part.

39. A method as defined in claim 29, further comprising:
determining correlation properties of at least one of said at least one transmission matrix.

40. A method as defined in claim 29, further comprising:
processing said processed symbols with at least one transmitter-specific matrix for separating transmissions from transmitters.

41. A method as defined in claim 29, further comprising:
selecting said second matrix from a plurality of second matrices relating to a plurality of transmitters.

42. A method as defined in claim 29, wherein said applying comprises multiplying said at least one transmission matrix with at least one of the following: a scalar, a complex scalar, and a unitary matrix.

43. An apparatus, comprising;
a storage configured to store at least one transmission matrix relating to a set of symbols;
a processor configured to apply at least part of said at least one transmission matrix to symbols forming at least a subset of said set of symbols for forming processed symbols; and
a generator configured to generate at least one transmission signal based on said processed symbols, wherein said at least one transmission matrix is a Kronecker product of a first matrix, an identity matrix having a size of at least two times two, and a second matrix, said second matrix being different from said identity matrix, and the size of each of the second matrix and the first matrix being at least two times two.

44. An apparatus as defined in claim 43, further comprising:
a transmitter for transmitting said at least one transmission signal.

45. An apparatus as defined in claim 44, further comprising:
one of the following: network element and a user device.

46. An apparatus as defined in claim 43, further comprising:
a controller network element.

47. A system, comprising:
a storage configured to store at least one transmission matrix relating to a set of symbols;
a processor configured to apply at least part of said at least one transmission matrix to symbols forming at least a subset of said set of symbols for forming processed symbols; and
a generator configured to generate at least one transmission signal based on said processed symbols, wherein said at least one transmission matrix is a Kronecker product of a first matrix, an identity matrix having a size of at least two times two, and a second matrix, said second matrix being different from said identity matrix, and the size of each of the second matrix and the first matrix being at least two times two.

48. An apparatus, comprising:
a demodulator configured to apply to signals received from a transmitter at least part of a receiver matrix which corresponds to at least one transmission matrix, said at least one transmission matrix being a Kronecker product of a first matrix, an identity matrix having a size of at least two times two, and a second matrix, said second matrix being different from said identity matrix, and the size of each of the second matrix and the first matrix being at least two times two.

49. A communication system, comprising:
at least one demodulator configured to apply to signals received from a transmitter at least part of a receiver matrix which corresponds to at least one transmission matrix, said at least one transmission matrix being a Kronecker product of a first matrix, an identity matrix having a size of at least two times two, and a second matrix, said second matrix being different from said identity matrix, and the size of each of the second matrix and the first matrix being at least two times two.

50. A system, comprising:
at least a block transmitter comprising
a storage configured to store at least one transmission matrix relating to a set of symbols,
a processor configured to apply at least part of said at least one transmission matrix to symbols forming at least a subset of said set of symbols for forming processed symbols, and
a generator configured to generate at least one transmission signal based on said processed symbols; and
a demodulator configured to apply to received signals at least part of a receiver matrix which corresponds to said at least one transmission matrix, said at least one transmission matrix being a Kronecker product of a first matrix, an identity matrix having a size of at least two times two, and a second matrix, said second matrix being different from said identity matrix, and the size of each of the second matrix and the first matrix being at least two times two.

51. A method in a communication system, comprising:
receiving signals; and
applying to received signals at least part of a receiver matrix which corresponds to at least one transmission matrix, said at least one transmission matrix being a Kronecker product of a first matrix, an identity matrix having the size of at least two times two, and a second matrix, said second matrix being different from an identity matrix, and the size of each of the second matrix and the first matrix being at least two times two.

52. A method in a communication system, comprising:
associating parts of at least one transmission matrix relating to a set of symbols a set of users, said at least one transmission matrix being a Kronecker product of a first matrix, an identity matrix, and a second matrix, said second matrix being different from said identity matrix and being at least two time two in size;
applying at least part of said at least one transmission matrix to at least one subset of said set of symbols for forming processed symbols; and
generating at least one transmission signal based on said processed symbols,
wherein receiver complexity is taken into account in associating parts of said at least one transmission matrix to said set of users, each user being associated with a receiver.

53. A method as defined in claim 52, wherein said receiver complexity is taken into account by associating parts of said at least one transmission matrix to said set of users based on correlation properties of said at least one transmission matrix.

54. An apparatus, comprising
a controller configured to associate parts of at least one transmission matrix relating to a set of symbols a set of users, said at least one transmission matrix being a Kronecker product of a first matrix, an identity matrix, and a second matrix, said second matrix being different from said identity matrix and being at least two time two in size;
a processor configured to apply at least part of said at least one transmission matrix to at least one subset of said set of symbols for forming processed symbols; and
a generator configured to generate at least one transmission signal based on said processed symbols,
wherein receiver complexity is taken into account in associating parts of said at least one transmission matrix to said set of users, each user being associated with a receiver.

55. An apparatus as defined in claim 54, further comprising:
a network element or a user device.

56. A system, comprising:
at least one transmitter, comprising
a controller configured to associate parts of at least one transmission matrix relating to a set of symbols a set of users, said at least one transmission matrix being a Kronecker product of a first matrix, an identity matrix, and a second matrix, said second matrix being different from said identity matrix and being at least two time two in size,
a processor configured to apply at least part of said at least one transmission matrix to at least one subset of said set of symbols for forming processed symbols, and
a generator configured to generate at least one transmission signal based on said processed symbols,
wherein receiver complexity is taken into account in associating parts of said at least one transmission matrix to said set of users; each user being associated with a receiver.

57. A computer program embodied on a computer readable medium, the computer program being configured to control a processor to perform:
applying at least part of at least one transmission matrix relating to a set of symbols to at least one subset of said set of symbols for forming processed symbols; and
generating at least one transmission signal based on said processed symbols,
wherein said at least one transmission matrix is a Kronecker product of a first matrix, an identity matrix having a size of at least two times two, and a second matrix, said second matrix being different from said identity matrix, and the size of each of the second matrix and the first matrix being at least two times two.

58. A computer program embodied on a computer readable medium, the computer program being configured to control a processor to perform:
applying at least part of at least one transmission matrix relating to a set of symbols to at least one subset of said set of symbols for forming processed symbols; and
generating at least one transmission signal based on said processed symbols,
wherein said at least one transmission matrix is a Kronecker product of a first matrix and a second matrix, said second matrix being different from an identity matrix, a size of each of the second matrix and the first matrix being at least two times two, and at least one entry of the first matrix having a complex value.

59. A computer program embodied on a computer readable medium, the computer program being configured to control a processor to perform:
receiving signals; and
applying to received signals at least part of a receiver matrix which corresponds to at least one transmission matrix, said at least one transmission matrix being a Kronecker product of a first matrix, an identity matrix having the size of at least two times two, and a second matrix, said second matrix being different from an identity matrix, and the size of each of the second matrix and the first matrix being at least two times two.

60. A computer program embodied on a computer readable medium, the computer program being configured to control a processor to perform:
receiving signals; and
applying on the received signals at least part of a receiver matrix which corresponds to at least one transmission matrix, said at least one transmission matrix being a Kronecker product of a first matrix and a second matrix, said second matrix being different from an identity matrix, a size of each of the second matrix and the first matrix being at least two times two, and at least one entry of the first matrix having a complex value, wherein said second matrix is a Hadamard matrix and said first matrix is an inverse Fast Fourier Transform matrix.

61. A computer program embodied on a computer readable medium, the computer program being configured to control a processor to perform:
associating parts of at least one transmission matrix relating to a set of symbols a set of users, said at least one transmission matrix being a Kronecker product of a first matrix, an identity matrix, and a second matrix, said second matrix being different from said identity matrix and being at least two time two in size;
applying at least part of said at least one transmission matrix to at least one subset of said set of symbols for forming processed symbols; and
generating at least one transmission signal based on said processed symbols,
wherein receiver complexity is taken into account in associating parts of said at least one transmission matrix to said set of users, each user being associated with a receiver.

* * * * *